March 26, 1946.  L. A. KILGORE ET AL  2,397,183
FLUID IMPELLER DRIVE
Filed Aug. 17, 1943  3 Sheets-Sheet 1

WITNESSES:

INVENTORS
Lee A. Kilgore and
Philip C. Smith.
BY
Paul E. Friedemann
ATTORNEY

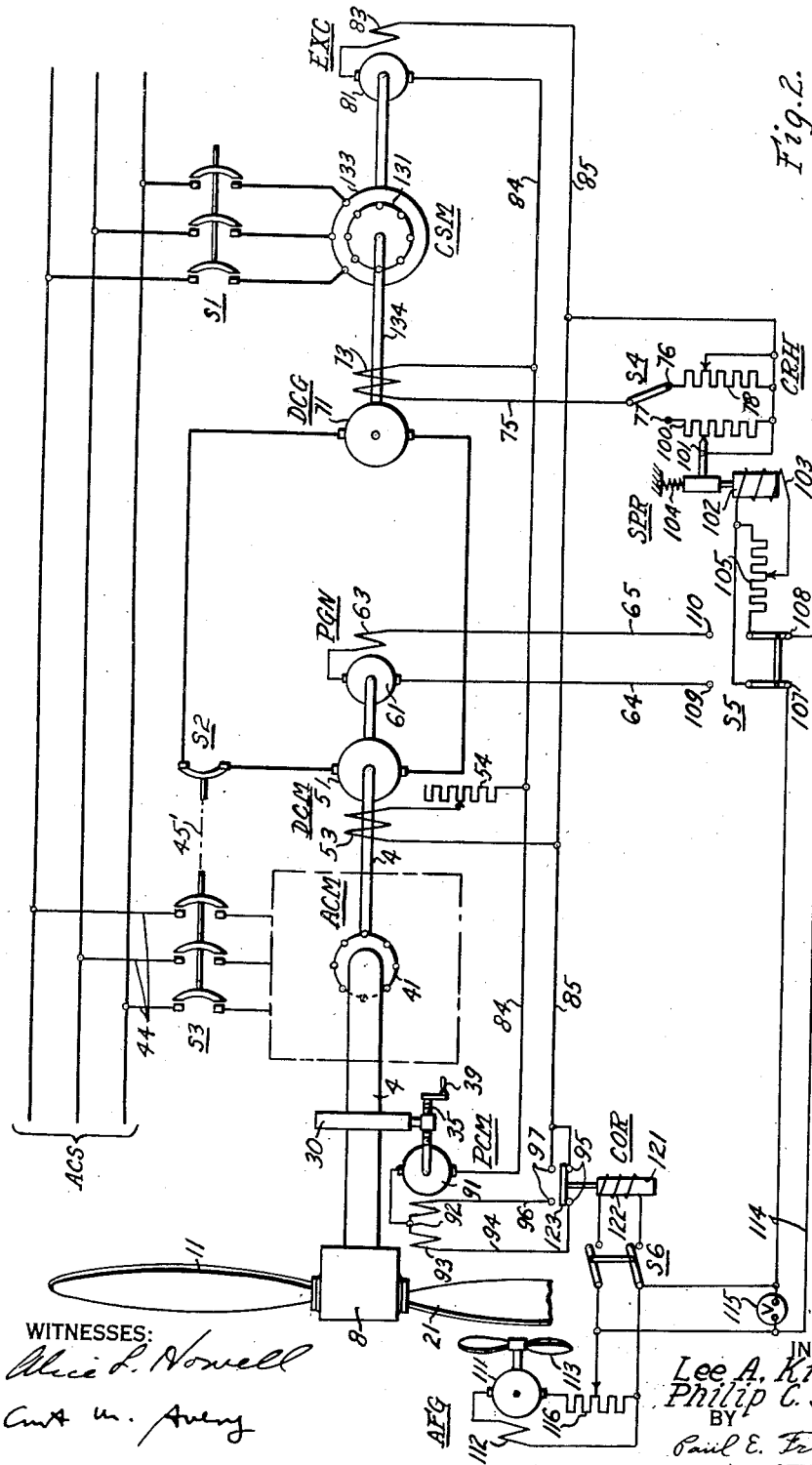

Patented Mar. 26, 1946

2,397,183

UNITED STATES PATENT OFFICE 2,397,183

FLUID IMPELLER DRIVE

Lee A. Kilgore, Forest Hills, and Philip C. Smith, Wilkinsburg, Pa., assignors to Westinghouse Electric Corporation, East Pittsburgh, Pa., a corporation of Pennsylvania Application August 17, 1943, Serial No. 499,014

14 Claims. (Cl. 230—114)

Our invention relates to fluid impeller drives, and more particularly to air impeller drives such as used for operating wind tunnels, vehicle tunnel ventilation, power house fan drives and other industrial blower applications where a wide range of air velocities, air densities or rates of flow is desirable.

It is an object of the invention to provide an air impeller drive which affords a far wider range of gradually regulatable air flow conditions than obtainable with the drive systems heretofore available.

It is also an object of the invention to achieve the just-mentioned wide range of regulation by means of a drive system which, as a unit, is suitable and favorable for alternating-current operation from the customary alternating current supply.

A further object of our invention is to provide a fluid impeller drive which contains a multi-speed alternating current motor of the induction or squirrel cage type but affords a gradual regulation of the fluid flow intermediate the flow magnitudes determined by the fixed speed steps of the alternating current motor.

Another object of the invention relates to employing in regulatable fluid impeller drives a multi-speed induction motor with a plurality of sets of interleaved field windings and aims at improving and simplifying the means required for starting the motor.

A still further object of our invention deals with alternating current energized impeller drives and consists in providing improved regulating and control means for accurately adjusting a desired fluid flow condition to a selected magnitude and maintaining this magnitude automatically at a constant value.

In order to achieve these objects and advantages, an impeller drive according to the invention is designed in accordance with one or several of the features set forth presently.

In one of its aspects, the invention provides a multi-speed induction type motor in combination with a variable pitch propeller, so that the air flow is adjusted by selecting one of the available fixed speed steps of the motor and varying the flow at the selected speed step by controlling the propeller pitch.

In another aspect, allied to the foregoing, the invention requires a variable pitch propeller for producing the desired fluid flow and provides both a multi-speed induction-type motor and a variable speed direct current motor for driving the propeller at high speeds and low speeds, respectively. Pitch control means are associated with the propeller for varying the air flow at the selected high speed step of the alternating current motor, while a regulatable energizing circuit is connected with the direct current motor for driving the latter at variable low speeds. As a result, the drive affords a wide range of fluid speeds or densities. The range is determined by the combined speed range of the alternating current motor and direct current motor and is gradually adjustable over the entire combined range thus afforded.

According to another feature of the invention, a fluid impeller drive having an induction motor with a plurality of sets of interleaved windings to permit operating at different selective speeds for driving a fluid impeller member, is provided with a single set of reactors which are connected in parallel to all winding sets of the motor so as to form the neutral connection between the windings of any set operative at the selected motor speed. Switch means are employed in connection with the reactors for inserting them when starting the motor and shorting them after the starting period.

Other features of the invention provide a direct current drive motor in combination with a motor-generator control system of particular design and operation, while still other features involve associated control and regulating means. However, since these features will be more easily understood from an embodiment of the invention, reference is had to the following description from which these and the aforementioned features will be apparent as well as the above-stated and other objects and advantages of our invention.

The description, presented hereinafter, relates to a complete air impeller drive exemplifying the invention and illustrated in the accompanying drawings, in which:

Fig. 2 is a circuit diagram of the complete drive system including the portion represented by Fig. 1 but showing the appertaining alternating current motor in a schematical manner;

Figure 1:
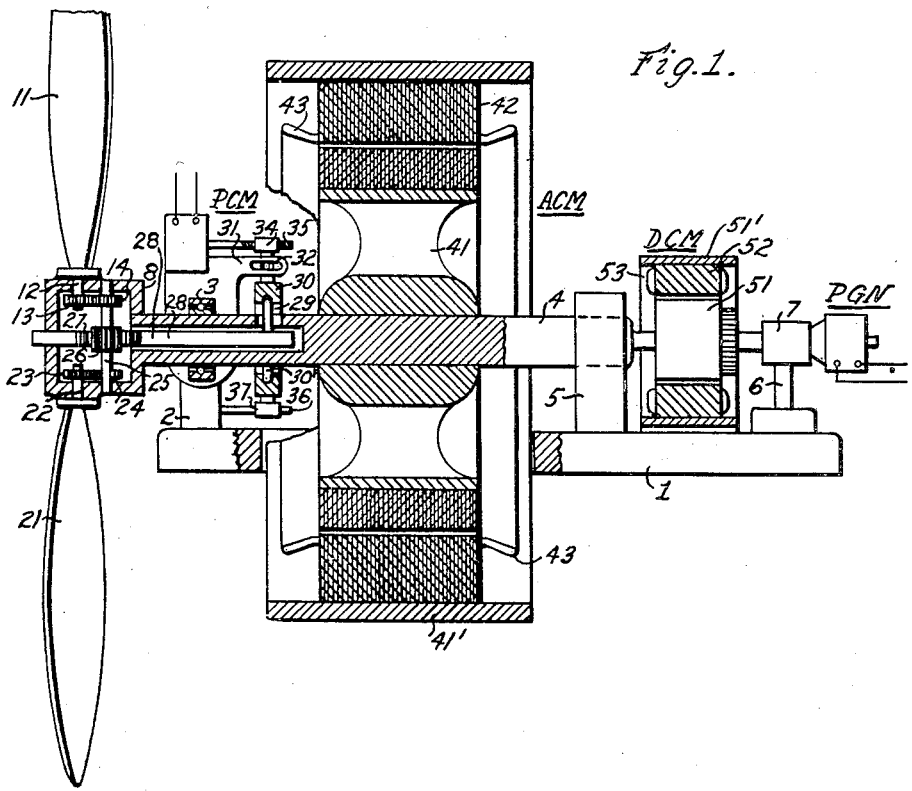
Figure 1 shows a diagrammatic sectional view of a variable pitch propeller and the appertaining electro-motoric portion of the drive system.

Referring to Fig. 1, 1 denotes the base structure of a propeller driving unit which forms part of a system according to the present invention. A standard 2 is mounted on the base structure 1 and carries a bearing 3 for journalling the propeller and motor shaft 4. The other end of the shaft passes through a bearing mounted on another standard 5. The shaft 4 has an extension whose end is journalled in a bearing 7 carried by a third standard 6 which is also mounted on the base 1.

A gear casing 8 is attached to the shaft 4 and forms the hub of the variable pitch propeller. The propeller has two blades 11 and 21 provided with propeller shafts 12 and 22, respectively. Each of the shafts carries a spur gear 13 or 23 which meshes with another spur gear 14 and 24, respectively. The two gears 14 and 24 are mounted on separate shafts of which one is visible in the drawings and denoted by 25. Each of these shafts carries a pinion, such as 26 in fixed relation to appertaining spur gears 14 and 24. A rack 28 having two opposite spur portions at 27 is disposed in an axial hollow of the shaft 4 so that its spur portions 27 mesh with the respective pinion 26. The rack 28 is axially displaceable and when displaced causes the above-mentioned gears 14 and 24 to rotate in opposite directions with the effect of varying the pitch of the propeller blades 11 and 21 in proper relation to each other.

A transmission member 29 is firmly attached to the rack 28 and extends through an opening of the shaft 4 with sufficient play to be displaceable in the axial direction of the shaft. A ring member 30 engages the rack member 29 by means of an inner circumferential groove 30'. Oppositely arranged holders 34 and 37 are attached to the ring 30. The holder 34 is guided at 32 in a stationary portion 31 of the standard 2 and the holder 37 is guided by means of a guiding pin 36 also attached to the standard 2. Due to these holders and guidances, the ring member 30 is limited to straight movements in the axial direction of the shaft 4. The holder 34 has a threaded bore which engages a threaded shaft 35 of a pitch controlled motor PCM which is also mounted on the portion 31 of the stationary standard 2. When the motor PCM is in operation, the rotation of its shaft 35 causes the holder 34, and hence the ring member 30 to move in either direction along the shaft 4 and to operate through the rack 28, the gearing in the propeller hub 8, thereby changing the pitch of the propeller blades 11 and 21 accordingly. The operation and control of the motor PCM will be explained in a later place with reference to Figs. 2 and 3.

The propeller shaft 4 is driven by means of an alternating current motor denoted by ACM or by a direct current motor denoted by DCM. The armature 41 of motor ACM is mounted on the shaft 4 and is preferably designed as a squirrel cage armature. The magnet body 42 of the stator of ACM, mounted in a casing 41', is provided with multiple windings 43 in a manner which will be apparent from the following description of the circuit diagrams shown in Figs. 3, 4, and 5.

The direct-current motor DCM has its armature 51 mounted on the extension of the propeller shaft 4. 52 is the magnet body of the stator of DCM. It is enclosed by a housing 51' and carries a field winding 53.

A direct current pilot generator PGN is mounted on the elements 7 and 6 of the supporting base structure. Its armature is secured to the extension of shaft 4. The voltage of the direct current produced by PGN is proportional to the speed of shaft 4 and hence a measure of the propeller speed.

Turning now to the circuit diagram of Fig. 2, the above described variable pitch propeller, pitch control motor PCM, motors ACM and DCM and the pilot generator PGN will also be recognized in this figure as well as their electrical relation to one another and to the other elements of the drive system. The motor ACM with its armature 41 is shown schematically; its details and control equipment, here denoted by an enclosing dot-and-dash line 43', will be explained in a later place when discussing Fig. 3. The motor ACM, according to Fig. 2, is connected with alternating-current mains ACS through leads 44 and through a switch S3. The direct current motor DCM has its armature 51 electrically connected over a switch S2 with the armature 71 of a direct current generator DCG. This generator forms part of a motor generator set which includes a constant speed motor CSM whose armature 131 is mounted on a common shaft 134 with the armature 71 of the generator DCG. The same shaft carries the armature 81 of an exciter EXC which serves as a source of a constant direct-current voltage. The exciter has a self-energized field winding 83 and feeds its current into an exciter circuit 84, 85. The field windings 133 of the constant speed motor CSM are connected to the alternating-current mains ACS through a switch S1.

The field winding 53 of the direct current drive motor DCM is energized from the exciter circuit with a regulating rheostat 54 interposed for adjusting the energization of field winding 53. Once properly adjusted, the setting of the rheostat 54 need not be changed during the normal operation of the drive system.

The field winding 73 of the generator DCG has one of its terminals connected to the exciter lead 84 while its other terminal is connected with a selector switch S4 whose movable contact member can be engaged with either stationary contact 76 or 77. A control rheostat CRH has its resistor 78 connected between the stationary contact 76 and lead 85 of the exciter circuit. A stationary contact 77 is connected through the resistor 100 of another regulating rheostat SPR with lead 85 of the exciter circuit. The slide contact 101 of control rheostat SPR is attached to a magnetic armature 102 actuated by a magnet coil 103. A spring 104 tends to hold the armature 102 and the slide contact 101 in one end position in opposition to the moving force produced by the armature 102 in dependence upon the energization of a relay winding 103. A calibrating rheostat 105 lies in parallel to the winding 103. As a rule, this rheostat need not be operated after the speed regulator has once been calibrated.

The speed regulator SPR, including the elements 100 through 104, may consist of a regulator unit available under the trade name Silverstat. Regulators of this type are described and illustrated in Patent No. 2,249,826, issued July 22, 1941, to C. R. Hanna. However, other types of automatic regulators may be used instead.

The control coil 103 of the speed regulator SPR is connected to a switch S5 whose movable contact members engage either stationary contacts 107 and 108 or 109 and 110. The switch is preferably also provided with an intermediate or neutral position in which the speed regulator is disconnected from the two sets of contacts just mentioned.

An air flow gage AFG consisting of a small measuring generator is arranged so as to react to the air flow produced by the variable pitch propeller. The air flow gage contains an armature 111, a self-exciting field winding 112 and a propeller 113 mounted on the armature shaft and driving the armature in dependence upon the speed or density of the air flow. As a result, the voltage produced by the air flow gage is a measure of the speed or density of the air flow.

A voltmetric measuring instrument 115 is connected to AFG in order to indicate or record the magnitude to be measured. The air flow gage is also connected through leads 114 with the stationary contacts 107 and 108 of switch S5. Hence, when switch S5 is in the illustrated position, the gage AFG is connected to the speed regulator SPR so that the effective resistance of the speed regulator is now controlled in accordance with the flow magnitude measured by the gage AFG. When switch S4 is adjusted to connect its stationary contact 77 with winding 73, the energization of winding 73 is controlled by the speed regulator SPR in dependence upon the measured air flow condition. On the other hand, if switch S4 engages the stationary contact 76, as is shown in Fig. 2, the energization of field winding 73 depends upon the adjustment of the rheostat 78 and can be regulated manually or by any suitable automatic control means acting on rheostat 78.

Still referring to the control of the generator field 73 by the control rheostat CRH or the speed regulator SPR, it will be seen from the foregoing that when switch S2 is closed and hence the armature 51 of the drive motor DCM connected to the armature 71 of the generator DCG, the speed of the drive motor DCM is dependent on and controlled by the adjustment of the control device CRH or SPR then in operation. Switch S2 is coupled with switch S3 by means indicated by the dot and dash line 45', so that either switch is open when the other switch is closed. Consequently, the alternating current motor ACM is inoperative when the above described control of the generator DCG is effective. That is, when motor DCM is energized, the armature 41 of motor ACM runs idle.

The pitch control motor PCM whose armature 91 actuates the threaded shaft 35 for displacing the ring member 30 in order to vary the pitch of the propeller blades 11 and 21, has one of its terminals connected with lead 84 of the exciter circuit. The other terminal, at 92, is connected to the midpoint of a split field winding 93 whose ends, in turn, are connected through leads 94 and 96, respectively, to the stationary contacts of a control relay COR. This relay has a movable contact 123 connected with an armature 121 which controlled by a winding 122. In the position illustrated, the movable contact 123 bridges a pair of stationary contacts 95 and connects lead 94 to lead 85 of the exciter circuit. When the winding 122 is caused to move the armature 121 so as to place the movable contact 123 into engagement with the upper pair of contacts 97 of the control relay, the lead 94 is disconnected from 85 while now lead 96 is in connection through 97 and 123 with the exciter lead 85. The result of the relay operation is to reverse the polarity of the motor field in PCM. Therefore, the motor PCM runs in one or the other direction, depending upon the energization of coil 121, and adjusts the pitch of the propeller blades 11 and 21 accordingly. A switch S6 connects winding 121 of COR with the above-mentioned air flow gage AFG. When switch S6 is closed, switch S5 being preferably in neutral position so as to keep the speed regulator SPR ineffective, the relay COR is controlled in dependence upon an air flow condition to be measured. As will be shown presently, this control is in operation when switch S3 is closed and switch S2 opened so that the generator DCG and the motor DCM are inoperative while the driving power of the propeller is supplied by the high speed motor ACM.

Figure 3:
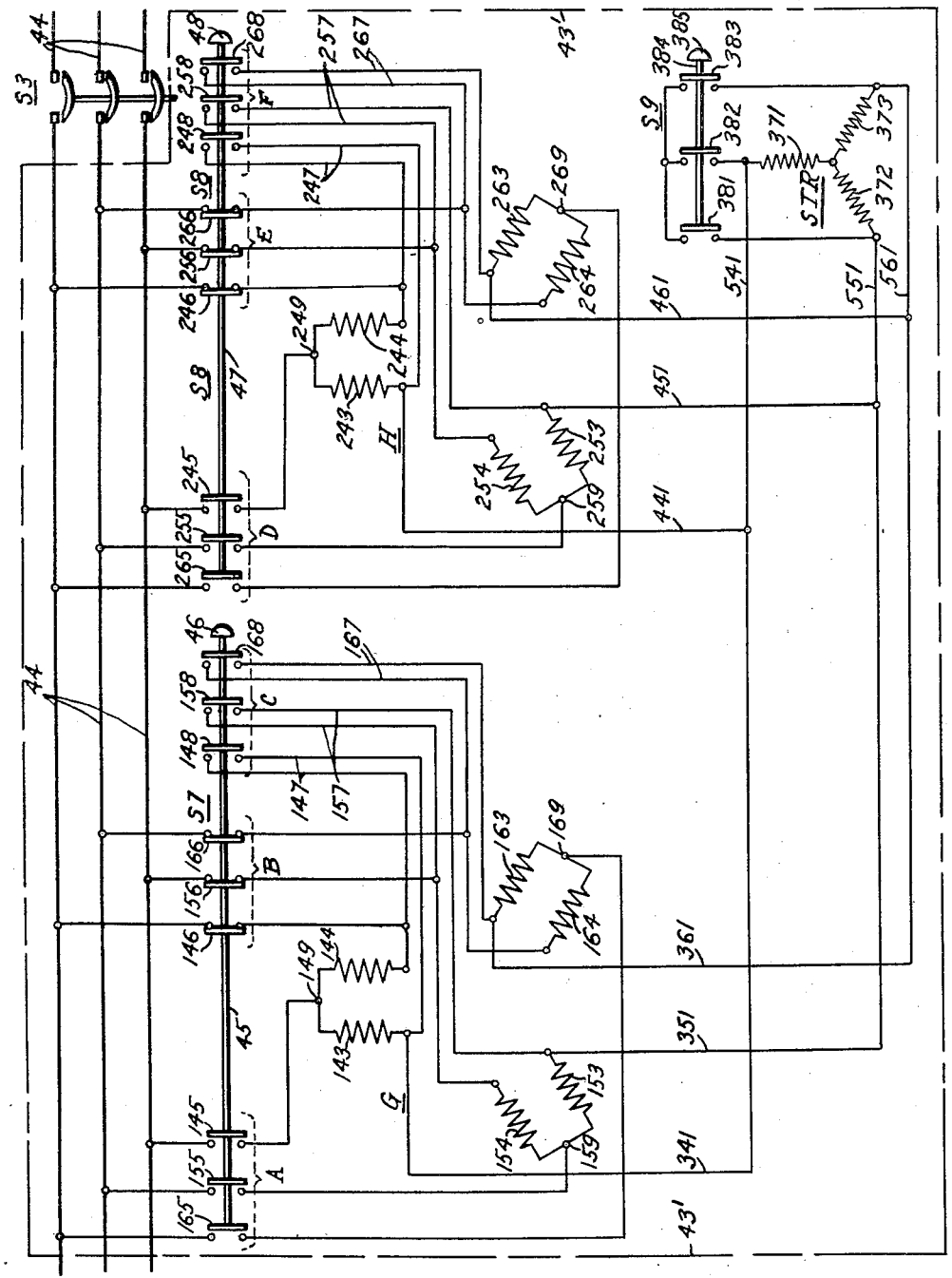
Fig. 3 is a detailed diagram of the field circuits of the just-mentioned alternating current motor of Figs. 1 and 2.

Referring now to Fig. 3 of the drawings, the design and operation of the motor ACM and its appertaining control elements will be explained more in detail. The alternating current mains 44, switch S3 and leads 40 shown in Fig. 3 are identical with the correspondingly designated elements in Fig. 2. It will be understood that the other elements apparent from Fig. 3 are included in the control system of the motor ACM symbolically indicated in Fig. 2 by the dot-and-dash line enclosure 43'.

Motor ACM has a squirrel cage armature 41 (Fig. 2) cooperating with a plurality of field windings so arranged and provided with control elements to run the motor with a selective number of different poles in order to select an according speed. Multiple speed motors of this type are known as such and are described for instance by Miles Walker in "The Control of the Speed and Power Factor of Induction Motors," 1929, Chapter V, Section IV, pages 67 to 85. However, the motor of this type applied in connection with the present invention and designed for cooperation with the direct-current drive and the other above described controlled devices, is fully described hereinafter as far as is necessary for disclosing and explaining the present invention.

Motor ACM is provided with two sets G and H of interleaved field windings. Set G is wound for 6 and 12 poles. Set H is wound for 8 and 16 poles. Each set has three pairs of windings. Each pair is tapped at its center point in order to permit the two appertaining coils to be connected in parallel or series for changing from lower to higher pole numbers and hence from lower to higher speed steps.

Referring to the set of windings G, a pair of coils 143 and 144 whose midpoint 149 is connected to the contacts of a switch member 145 appertaining to a switch S7. The switch member 145 and the other members of the same switch mentioned hereinafter are illustrated as being mounted on a common tappet 45 to be operated by a push button 46. However, push button type switches are shown only in order to simplify the illustration and to facilitate understanding the invention. In practice, other types of switches, in particular a controller including all of the switching devices within a single unit, may be used to advantage.

The second pair of windings of set G has its coils 153 and 154 connected at 159 with the contacts of a switch member 155. Similarly, the coils 163 and 164 of the third pair of windings of set G have their midpoint 169 connected to the contacts of a switch member 165. The three switch members 145, 155, and 165 form a unit denoted by A.

The outer terminal of coil 144 is connected to a switch member 146 of another set of contacts denoted by B. Similarly, the inner ends of coils 154 and 164 are connected to the contacts of switch members 156 and 166, respectively, of contact set B.

The outer ends of each pair of field coils are connected through respective leads 147, 157 and 167 to the contacts of switch members 148, 158 and 168 forming a third set of contacts which is denoted by C. In the illustrated position, the contacts of sets A and C are open while the contacts of set B are closed. The switch S7 is so designed that it has also an intermediate or neutral position wherein all contacts of sets A, B and C are opened so that the entire set of windings G remains inoperative.

The set of windings denoted by H and wound for 8 and 16 poles is connected to the contacts of a switch S8 which is arranged and designed similar to the above-mentioned switch S7. Switch S8 has three sets of contacts marked D, E and F, respectively. The contact members of this switch are shown for the purpose of illustration as being mounted on a common tappet 47 to be actuated by a push button 48.

The contacts of switch members 245, 255 and 265 (set D) are connected to the midpoints 249, 259 and 269 of each pair of coils 243 and 244, 253 and 254, 263 and 264, respectively. The contacts of switch members 248, 258 and 268, forming the contact set F, are connected by leads 247, 257 and 267, respectively, with the outer ends of the three pairs of coils respectively. The contact set E is formed by the contacts of switch members 296, 256 and 266.

In the illustrated position of switch S8, contact sets D and F are open while the contacts of set E are closed. When actuating the switch so that the contact set E is opened, the two other sets are closed. The switch has also an intermediate or neutral position in which all its contacts are open, so that then the entire set of field windings H is disconnected and inoperative.

It will be seen that when the contacts of set C are closed, the outer ends of each pair of coils of set G are shorted so that the coils 143 and 144 lie in parallel to each other while coils 153 and 154, as well as coils 163 and 164, are likewise connected in parallel. The same parallel connection as regards each pair of coils is established in set H when the contact set F is closed.

In order to provide the necessary neutral connection between the three pairs of coils of each set G or H, a switch S9 is provided in combination with a starting resistance or impedance device STR. The switch S9 has three switch members 381, 382 and 383 illustrated as being attached to a common tappet 384 to be operated by a push button 385. The three impedance members, for instance inductance coils 371, 372 and 373 of STR, are star-connected to one another and are also in connection with the contacts of switch S9 so as to be shorted when the switch is closed. Three leads 541, 551 and 561 are connected to the three respective terminals of reactors 371, 372 and 373. The outer or neutral terminal of coil 143 is connected with a neutral lead 541 through connection 341. The corresponding ends of windings 153 and 163 are connected through conductors 351 and 361 to the neutral leads 551 and 561, respectively. The neutral ends of coils 243, 253 and 263 of set H are similarly connected with the neutral leads 541, 551 and 561 through conductors 441, 451 and 461 respectively.

When the switch S9 is in the illustrated open position, the three reactors 371, 372 and 373 form the neutral connection between the windings of the set G or H then in operation and hence provide proper conditions for starting the motor. After the starting period, the switch S9 is closed, thereby shorting the three reactors of STR. As a result, the neutral terminals of the set of windings then in operation are directly connected with one another so as to form an immediate star point connection. As will be explained in a later place, only one of the two sets of windings G and H is energized at a time. The just described starting device thus suffices to effect a proper starting operation regardless of the selected set of windings.

The above described multiple drive system operates as follows:

As mentioned previously, the drive motor DCM serves to actuate the propeller at low speeds while the alternating current motor ACM is operative only at high speeds. The speed ranges are preferably so chosen that they complement each other in order to afford a substantially continuous range of regulation from the lowest to the highest available speeds. The system also provides for a substantially gradual or continuous speed regulation over the entire combined speed range.

Let us first assume that the drive is to be operated at low speeds and that the speed magnitude is to be regulated by the attendant at will within the lower speed range.

In order to start the operation, switch S1 (Fig. 2) is closed so that the constant speed motor CSM starts actuating the generator DCG and the exciter EXC at constant speed. Then the switch S2 is closed, thereby placing switch S3 in the open position, as illustrated in Fig. 2. The closure of switch S2 connects the armature 51 of the direct current motor DCM to the armature circuit of the generator DCG. The entire control system of ACM is disconnected and remains inoperative. The field winding 53 of motor DCM is properly energized from the exciter circuit, assuming that the rheostat 54 was adjusted previously to the desired voltage calibration.

Since the speed of the motor DCM is to be controlled manually or automatically by the control rheostat CRH, the switch S4 is kept in engagement with contact 76 in accordance with the illustration in Fig. 2. In this position of S4, field winding 73 of the generator DCG is energized by the exciter over the variable resistance of CRH. Consequently, the generator field can be controlled by displacing the slide contact of CRH. This permits changing the output voltage of DCG over the entire available range of control. The speed or torque of the drive motor DCM changes accordingly.

For an automatic control of the speed at direct current operation, switches S1 and S2 remain set as described previously, while switch S4 is set for connecting contact 77 with lead 75 so that now the resistor 100 of the speed regulator SPR is inserted between the exciter circuit and the generator field winding 73. If switch S5 is set as shown in Fig. 2, the air flow gage AFG is connected with the control winding 103 of the speed regulator SPR, and hence controls the generator DCG and the speed of the drive motor DCM in dependence upon the flow condition measured by AFG. At this operation, switch S6 remains open so that the control relay COR is inoperative with its switch member 123 in an intermediate position so that the field winding 93 of the pitch control motor PCM is disconnected from the exciter circuit. During the direct-current operation the motor PCM is not in use and the pitch of propeller blades 11 and 21 is set to a fixed value. It is, of course, also possible to employ a pitch regulation when operating at low speed with direct current. However, such a pitch control is as a rule not required, since a complete control can be usually obtained by the control and regulating elements just described.

When placing switch S5 in contact with stationary contacts 109 and 110, switches S1 and S2 being closed and switch S4 in engagement with contact 77, the control coil 103 of the speed regulator SPR is connected through leads 64 and 65 with the armature 61 and field winding 63 of the pilot generator PGN. As a result, the operation of SPR is now controlled by the voltage produced by PGN, and since this voltage varies in accordance with the speed of the propeller shaft 4, the arrangement has now the tendency to maintain the speed at a constant value. The rheostat 105 may be used for setting the datum value of the speed thus to be kept constant. The rheostat 54 regulating the energization of the motor field 53 may also be used for this purpose.

In order to operate the propeller drive at high speeds beyond the speed range of the direct-current drive, switch S2 is opened and switch S3 closed, so as to energize the main leads 44 of the alternating current system shown in Fig. 3.

When starting the drive for alternating current operation, the switch S1 is closed so that the exciter EXC is in operation and ready to supply the leads 84 and 85 with direct current of constant voltage. After a previous election of one of the four available high-speed steps of the alternating-current motor by setting the switches S7 and S8 (Fig. 3) correspondingly, the set of windings G or H then in operation is energized with the starting switch S9 in the illustrated open position. In this position, the reactors 371, 372 and 373 are inserted in the neutral star connection. After the motor ACM has reached full speed, the switch S9 is closed so as to shorten the reactors of STR. The motor operates then at the selected speed.

The setting of switches S7 and S8 required for a proper selection of one of the four high speed steps will now be described with reference to Fig. 3.

In order to set the alternating-current motor for operation at highest speed, switch S7 is actuated so as to close the contact sets A and C with contact set B remaining open. Switch S8 is placed in inoperative position so that all of contact sets D, E and F remain open. That is, for operating the motor ACM at highest speed the set of windings H is disconnected from the current mains and only set G is put in operation. With the switch setting just mentioned, the current from mains 44 flow through switch member 145 and midpoint 149 in parallel through coils 143 and 144 to switch member 148 and also through leads 341 and 541 to the star point passing either through reactor 371 when starting the motor or through switch member 381 when the motor runs at full speed. The pairs of coils 153, 154 and 163, 164 of set G are similarly connected between mains 44 and the star point. The parallel connection of the pairs of coils of set H thus obtained at full speed is separately illustrated in the straight-line diagram of Fig. 4. When energizing set G in this manner, the motor ACM operates with six poles and hence develops its highest available speed.

Figure 4:
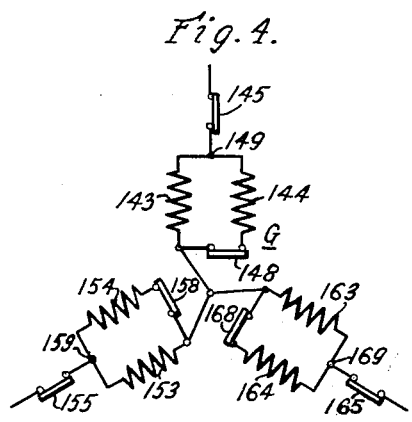
Figs. 4 and 5 show diagrammatically two different connections of one of the two sets of field windings shown in Fig. 3 in order to elucidate the operation of the alternating current portion of the drive system.
Figure 5:
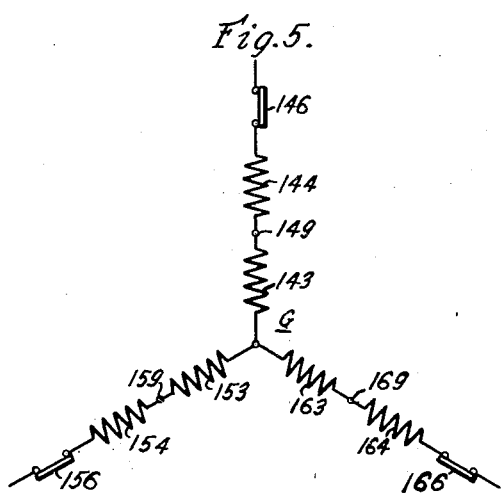

In order to run the motor ACM at a speed corresponding to the second highest speed step, switch S7 is placed in intermediate position so that the sets of contacts A, B and C remain open and the field windings of set G inoperative. Switch S8 is placed in position to close the sets of contacts D and F while contact set E remains open. With this setting of switches S7 and S8, the current from mains 44 flows through switch member 245 to midpoint 249, thence in parallel through coils 243 and 244 over leads 247 to switch members 248 and also through leads 441 and 541 to the star point connection. Similarly, the two other pairs of coils 253, 254 and 263, 264 of set H are connected between mains 44 and the star point connection. The parallel connection of set H is similar to the above described parallel connection of set G, as shown in Fig. 4. As a result, the squirrel cage armature of motor ACM is now operated with eight effective poles.

For operating motor ACM at a speed corresponding to the third highest speed step, switch S8 is placed in intermediate position so that contact sets D and F remain open and the set of windings H inoperative. Switch S7 is kept in the illustrated position so that contact sets A and C are opened while set B is closed. With the switches S7 and S8 in this position, the current from mains 44 flows through the elements 146, 144, 143, 341, 541 and 381 to neutral. That is, coils 143 and 144 are now energized in series connection. The two other pairs of coils of set G are likewise energized in series arrangement between mains 44 and neutral. The series connection thus established at full speed is illustrated in the straight-line diagram of Fig. 5. It results in an operation of set G with twelve poles.

The lowest speed step of the motor ACM is adjusted by placing switch S7 in intermediate position so that contact sets A, B and C remain open and the set of windings G disconnected. Switch S8 is placed as illustrated in Fig. 2; that is, contacts D and F remain open while contact set E is closed. With this adjustment of switches S7 and S8, the current from mains 44 flows through elements 246, 244, 243, 441, 541 to neutral. Similarly, the two other pairs of coils of set H are each series connected between the supply mains and neutral. As a result, the set of windings H is now energized in a series connection similar to the one shown in Fig. 5 with respect to winding set G, and the motor operates now with sixteen poles.

While the alternating-current drive permits merely to select one of a fixed number of given speed steps, the speed or density of the air flow produced by the propeller blades 11 and 21 at each of the available speed steps can be adjusted to intermediate values by means of the pitch control devices. According to Fig. 2, the worm shaft 35 is provided with manual adjusting means here represented by a crank 39. Consequently, with the pitch control motor PCM kept inoperative by disconnecting the switch S6, the air flow conditions can be adjusted at will. This, in combination with a proper selection of the basic speed step of the high-speed drive, permits a substantially continuous and gradual control of air flow conditions over the entire available range of high-speed alternating current operation.

The illustrated system, according to Fig. 2, is also designed for an automatic pitch control. In order to obtain such a control, switch S6 is closed with switch S5 placed in neutral position. Due to this setting of switch S6, the air flow gage AFG is connected with the control winding 121 of the control relay COR. The winding is now supplied with current of variable voltage depending upon the response of the air flow gage AFG to the air flow conditions produced by the propeller blades 11 and 21 at the selected speed of ACM. As long as the voltage supplied to COR by AFG remains below a datum value adjusted at 116, the contact member 123 of COR engages the relay contacts 95 and causes the pitch control motor PCM to run in one direction. If the voltage supplied from AFG rises above the datum value, contact member 123 is placed in engagement with contacts 97 and causes the pitch control motor PCM to run in the other direction. As a result, the control arrangement has the effect of maintaining the air flow condition such as air speed or density at a constant value.

We claim as our invention:

1. An air impeller drive system comprising in combination a variable pitch propeller, an alternating current induction motor having a squirrel cage armature mechanically connected with said propeller for driving the latter at high speeds, said alternating current motor having a multiple field winding for actuating said armature at different given speeds, selective current supply means connected with said field windings for selecting one of said speeds, pitch control means connected with said propeller for varying the air flow produced by said propeller at the selected speed, a direct current motor also connected with said propeller for driving it at low speed, and direct current supply means connected with said direct current motor and including voltage control means for varying the speed of said direct current motor and thereby the air flow produced by said propeller at low speeds, whereby said system has an increased and substantially continuous range of gradually variable air speeds.

2. An air impeller drive system comprising in combination a variable pitch propeller, an alternating current induction motor having a single armature mechanically connected with said propeller for driving said propeller at high speeds, said alternating current motor having two sets of interleaved pairs of field windings, each of said pairs being wound and tapped for a given number of poles differently from the given number and double number of poles of said other pair of windings in order to permit operating said alternating current motor with four different speeds, an energizing circuit having selective switch means connected with said field windings for selecting one of said speeds, pitch control means connected with said propeller for varying the air flow produced by said propeller at the selected speed, a direct current motor also connected with said propeller for driving it at low speed, and direct current supply means connected with said direct current motor and including voltage control means for varying the speed of said direct current motor and thereby the air flow produced by said propeller at low speeds, whereby said system has an increased and substantially continuous range of gradually variable air speeds.

3. An air impeller drive comprising in combination a variable pitch propeller, an alternating current multiphase motor for driving said propeller at high speeds, said alternating current motor having a plurality of interleaved multiphase field windings to operate at a multiple number of selective poles and speeds, current supply means having a selective switch connected with said windings for selecting one of said speeds, common multi-phase impedance means for starting said motor, said impedance means being connected in parallel to all of said sets of windings so as to form a neutral connection between the windings of each set, switch means connected with said impedance means for shorting them at normal operation of said alternating current motor, pitch control means connected with said propeller for varying the air flow produced by said propeller at the selected speed, a direct current motor also connected with said propeller for driving it at low speed, and direct current supply means connected with said direct current motor and including voltage control means for varying the speed of said direct current motor and thereby the air flow produced by said propeller at low speeds.

4. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow produced by said propeller at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding and containing variable circuit means for controlling the energization of said latter field winding in order to vary said voltage and hence the speed of said direct current motor, whereby the air flow produced by said propeller is adjustable over a range determined by the resultant total speed range of said multiple-speed alternating current motor and said direct current motor.

5. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow produced by said propeller at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding, control means disposed in said circuit for adjusting the energization of said generator field winding and thereby the speed of said direct current motor in accordance with a determinant of the air flow conditions produced by said propeller.

6. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow produced by said propeller at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding, and containing regulating means for controlling the energization of said generator field winding and thereby the speed of said direct current motor, a pilot generator mechanically connected with said common shaft and electrically connected with said regulating means for controlling the latter in dependence upon the speed of said shaft so as to cause said generator to maintain said direct current motor at constant speed, and adjusting means associated with said regulating means for setting the direct current motor speed to be kept constant.

7. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow produced by said propeller at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding, and containing regulating means for controlling the energization of said generator field winding and thereby the speed of said direct current motor, air-flow responsive control means connected with said regulating means for controlling the latter in dependence upon the air flow produced by said propeller so as to cause said generator to maintain said direct current motor at constant speed, and adjusting means associated with said regulating means for setting the direct current motor speed to be kept constant.

8. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow produced by said propeller at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding and containing regulating means for controlling the energization of said generator field winding and thereby the speed of said direct current motor, an air-flow responsive control device arranged for measuring the air flow produced by said propeller, selective contact means disposed between said control device and both said pitch control means and said regulating means for connecting said device with said pitch control means when said multiple speed alternating current motor is in operation and with said regulating means when said direct current motor is in operation, whereby the air flow is kept constant at a desired value.

9. A fluid impeller drive system comprising in combination an impeller member, an alternating current induction motor, an armature mechanically connected with said impeller member for driving said member at high speeds, said alternating current motor having a plurality of interleaved field windings for actuating said armature at different given speeds, an energizing circuit having selective contactor means connected with said field windings for selecting one of said speeds, mechanical control means interposed between said armature and said impeller member for varying the fluid flow produced by said member at said selected speed, a direct current motor also connected with said impeller member for driving said member at low speeds, and direct current supply means connected with said direct current motor and including voltage control means for varying the speed of said direct current motor and thereby the fluid flow produced by said impeller member at low speeds, whereby said system affords an increased and substantially continuous range of gradually variable fluid flow control.

10. An air impeller drive comprising in combination multiphase alternating current supply means, a variable pitch propeller, an alternating current motor for driving said propeller at high speeds, said motor having a plurality of multiphase field windings connected with said current supply means and wound in interleaved relation to one another to permit operating said motor with a multiple number of high speeds, selective connecting means interposed between said current supply means and said windings for setting said motor in accordance with the selected high speed, pitch control means connected with said propeller for varying the air flow at the selected high speed, a direct current motor for driving said propeller at low speeds, said two motors having a common drive shaft mechanically connected with said propeller, a direct current generator having an armature circuit connected with said direct current motor for energizing the latter, a field winding forming part of said generator for controlling the voltage in said armature circuit, an alternating current motor of constant speed mechanically connected with said generator for driving said generator, an energizing circuit connected to said generator field winding and containing regulating means for controlling the energization of said generator field winding and thereby the speed of said direct current motor, an air flow responsive control device disposed relative to said propeller so as to measure the air flow produced thereby, a pilot generator mechanically connected with said common shaft for producing a voltage in accordance with the speed of said shaft, selective switching means disposed between said regulating means and both said air-flow responsive control device and said pilot generator for connecting said regulating means selectively with either said control device or said pilot generator in order to regulate the air flow in dependence upon a datum condition of shaft speed and air flow, respectively, when said direct current motor is in operation, and adjusting means associated with said regulating means for setting said datum condition to be kept constant.

11. An air impeller drive comprising in combination, an impeller member, a variable speed direct current motor connected with said impeller member for driving the latter, a motor-generator set having an alternating current drive motor of constant speed and a direct current generator in driving connection with said alternating current motor and electrically connected to said direct current motor for feeding said direct current motor with current of variable voltage, said generator having a field winding for controlling the magnitude of said voltage, an energizing circuit connected to said field winding and containing regulating means for varying the energization of said winding, a variable impedance device arranged in said circuit for adjusting said regulating means, and control means subject to a determinant condition of the air flow produced by said impeller member and connected with said regulating means for controlling the latter so as to maintain said condition at a datum value corresponding to the selected adjustment of said impedance device.

12. An air impeller drive comprising in combination, an impeller member, a variable speed direct current motor in driving connection with said impeller member, a motor-generator set having an alternating current drive motor of constant speed and a direct current generator in driving connection with said alternating current motor and electrically connected to said direct current motor for feeding it with current of variable voltage, said generator having a field winding for controlling the magnitude of said voltage, an energizing circuit connected to said field winding and containing regulating means for varying the energization of said winding, a variable impedance device arranged in said circuit for adjusting said regulating means, speed-responsive control means mechanically connected with said impeller member so as to provide a variable voltage in accordance with the speed of said impeller member, air-flow responsive voltage control means disposed to measure a condition of the air flow produced by said impeller member, and selective connecting means for electrically connecting said speed-responsive control means and said air-flow responsive control means, respectively, to said regulating means for controlling the latter so as to regulate the speed of said direct current motor in accordance with the adjustment of said impedance device.

13. An air impeller drive comprising in combination multiphase alternating current supply means, a variable pitch propeller, an alternating current motor for driving said propeller at high speeds having a plurality of multiphase field windings connected with said current supply means and wound in interleaved relation to one another to permit operating said motor at given high speeds, selective connecting means interposed between said current supply means and said windings for setting said motor in accordance with the selected speed, pitch control means connected with said propeller for varying the air flow produced by said propeller at the selected speed, a direct current motor for driving said propeller at low speeds, said direct current motor having an armature mechanically connected with said alternating current motor and a field winding, a direct current generator having an armature circuit connected with said direct current motor armature and a generator field winding to control the voltage in said armature circuit, an alternating current motor of constant speed mechanically connected with said generator for driving the latter, an exciter of constant direct current output voltage associated with said constant speed alternating current motor and electrically connected with said field windings of said direct current motor and said direct current generator, current regulating means disposed between said exciter and said generator field winding, and control means responsive to a determinant condition of the air flow produced by said propeller and connected to said regulating means for causing the latter to vary said voltage of said generator armature circuit and thereby the speed of said direct current motor in dependence upon said condition.

14. An electromotoric multispeed drive comprising in combination a multiphase squirrel cage motor having a plurality of interleaved multiphase field windings to operate at a multiple number of selective poles and speeds, alternating current supply means having a selective switch connected with said windings for selecting one of said sets and speeds, common multiphase reactor means for starting said motor, said reactor means being connected in parallel to all of said sets of windings so as to form a neutral connection between the windings of each set, and switch means connected with said impedance means for shorting them at normal operation of said squirrel cage motor.

LEE A. KILGORE.
PHILIP C. SMITH.